US009774711B2

(12) United States Patent
Miyake et al.

(10) Patent No.: US 9,774,711 B2
(45) Date of Patent: Sep. 26, 2017

(54) MANAGEMENT SYSTEM, MANAGEMENT METHOD AND EQUIPMENT (71) Applicant: KYOCERA CORPORATION, Kyoto (JP)

(72) Inventors: Takashi Miyake, Sagamihara (JP); Kazutaka Nakamura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/432,022

(22) PCT Filed: Sep. 27, 2013

(86) PCT No.: PCT/JP2013/076231
§ 371 (c)(1),
(2) Date: Mar. 27, 2015

(87) PCT Pub. No.: WO2014/051039
PCT Pub. Date: Apr. 3, 2014

(65) Prior Publication Data
US 2015/0350391 A1 Dec. 3, 2015

(30) Foreign Application Priority Data
Sep. 27, 2012 (JP) ................. 2012-215300

(51) Int. Cl.
H04L 29/14 (2006.01)
H04L 29/08 (2006.01)
(Continued)

(52) U.S. Cl.
CPC .......... *H04L 69/40* (2013.01); *H04L 12/2823* (2013.01); *H04L 45/02* (2013.01);
(Continued)

(58) Field of Classification Search
None
See application file for complete search history.

(56) References Cited

U.S. PATENT DOCUMENTS 5,140,582 A 8/1992 Tsuboi et al.
5,453,989 A 9/1995 Kitayama et al.
(Continued)

FOREIGN PATENT DOCUMENTS

JP H03-101341 A 4/1991
JP H05-268187 A 10/1993
(Continued)

OTHER PUBLICATIONS

House information panel system—Machine translation, Applicaion No. 2003-084522, Matsushita Eletronic Works Ltd., Oct. 24, 2004, 21 pages.*
(Continued)

Primary Examiner — Bunjob Jaroenchonwanit
(74) Attorney, Agent, or Firm — Procopio Cory Hargreaves and Savitch LLP (57) ABSTRACT A storage battery device is provided with a transmitter which, in cases when a power supply of the storage battery device is turned on, repeatedly transmits, for a prescribed time period, a classification message including the classification of the storage battery device.

10 Claims, 6 Drawing Sheets (51) Int. Cl.
*H04L 12/751* (2013.01)
*H04L 12/28* (2006.01)
*H04L 29/12* (2006.01)
*H02J 3/46* (2006.01)
*H02J 3/14* (2006.01)
*H02J 3/32* (2006.01)
*H02J 3/38* (2006.01)
*H02J 7/35* (2006.01)
*H02J 13/00* (2006.01)

(52) U.S. Cl.
CPC ............... *H04L 67/12* (2013.01); *H02J 3/14* (2013.01); *H02J 3/32* (2013.01); *H02J 3/383* (2013.01); *H02J 3/46* (2013.01); *H02J 7/35* (2013.01); *H02J 13/0075* (2013.01); *H02J 2003/146* (2013.01); *H04L 61/2007* (2013.01); *Y02B 70/325* (2013.01); *Y02B 70/3225* (2013.01); *Y02E 10/563* (2013.01); *Y02E 10/566* (2013.01); *Y02E 40/72* (2013.01); *Y02E 70/30* (2013.01); *Y02P 80/23* (2015.11); *Y04S 10/123* (2013.01); *Y04S 20/222* (2013.01); *Y04S 20/224* (2013.01); *Y04S 20/228* (2013.01)

(56) References Cited

U.S. PATENT DOCUMENTS

| | | | | |
|---|---|---|---|---|
| 5,809,428 | A * | 9/1998 | Garahi | H04L 12/5875 340/7.22 |
| 6,118,771 | A * | 9/2000 | Tajika | H04L 12/185 370/328 |
| 6,150,928 | A * | 11/2000 | Murray | B60R 25/04 180/272 |
| 6,445,349 | B1 * | 9/2002 | Jones | H01Q 1/02 343/704 |
| 6,731,223 | B1 * | 5/2004 | Partyka | H04Q 9/00 340/540 |
| 6,977,916 | B1 * | 12/2005 | Sellin | H04W 92/12 370/337 |
| 7,366,123 | B1 * | 4/2008 | Biederman | G06F 1/30 370/311 |
| 8,351,975 | B2 * | 1/2013 | Anderson | H04W 52/20 370/318 |
| 8,514,861 | B2 * | 8/2013 | Barker, Jr. | H04L 12/189 370/390 |
| 9,085,241 | B2 | 7/2015 | Asano et al. | |
| 2003/0048199 | A1 * | 3/2003 | Zigdon | H04B 1/707 340/870.02 |
| 2004/0073327 | A1 * | 4/2004 | Shimada | G05B 19/4184 700/108 |
| 2004/0202143 | A1 * | 10/2004 | Diachina | H04B 7/2659 370/347 |
| 2004/0208159 | A1 * | 10/2004 | Jung | H04L 12/2805 370/346 |
| 2005/0009545 | A1 * | 1/2005 | Axelsson | H04W 48/04 455/502 |
| 2005/0034156 | A1 | 2/2005 | Terui | |
| 2005/0043059 | A1 * | 2/2005 | Petite | G01D 4/004 455/557 |
| 2005/0091338 | A1 * | 4/2005 | de la Huerga | A61J 1/1437 709/217 |
| 2005/0176493 | A1 * | 8/2005 | Nozaki | G07F 17/3239 463/24 |
| 2005/0179525 | A1 * | 8/2005 | Matsubara | B60R 25/104 340/426.13 |
| 2006/0261939 | A1 * | 11/2006 | Blakeway | G07C 9/00111 340/539.1 |
| 2007/0183318 | A1 | 8/2007 | Johnson et al. | |
| 2008/0041170 | A1 * | 2/2008 | Jobin | A01G 25/167 73/862.581 |
| 2008/0185447 | A1 * | 8/2008 | Kim | F24F 11/006 236/51 |
| 2008/0218378 | A1 * | 9/2008 | Bakken | G01D 4/006 340/870.03 |
| 2008/0266126 | A1 * | 10/2008 | Nakashima | G01R 31/3682 340/636.1 |
| 2008/0305743 | A1 * | 12/2008 | Aithal | H04L 43/0811 455/67.11 |
| 2010/0228843 | A1 * | 9/2010 | Ok | H04L 12/66 709/223 |
| 2010/0262736 | A1 * | 10/2010 | Wiesgickl | H04L 12/40182 710/110 |
| 2010/0263436 | A1 * | 10/2010 | Caron | A01G 25/167 73/38 |
| 2011/0025476 | A1 * | 2/2011 | Courtney | H05B 37/0272 340/12.5 |
| 2011/0031929 | A1 * | 2/2011 | Asada | H02J 7/0027 320/109 |
| 2011/0065380 | A1 * | 3/2011 | Kawakami | H04L 45/122 455/7 |
| 2011/0270550 | A1 * | 11/2011 | Kreiss | H02J 3/14 702/60 |
| 2012/0033578 | A1 * | 2/2012 | Anderson | H04W 52/20 370/252 |
| 2012/0144083 | A1 * | 6/2012 | Hassan | G06F 1/30 710/303 |
| 2013/0116020 | A1 * | 5/2013 | Barney | G06F 3/0487 463/3 |
| 2013/0202068 | A1 * | 8/2013 | Ly-Gagnon | H04W 52/0225 375/343 |
| 2014/0062721 | A1 * | 3/2014 | Zigdon | H04B 1/707 340/870.02 |

FOREIGN PATENT DOCUMENTS

| | | |
|---|---|---|
| JP | 2004-297275 A | 10/2004 |
| JP | 2005-64556 A | 3/2005 |
| JP | 2005-244753 A | 9/2005 |
| JP | 2009-106613 A | 5/2009 |
| JP | 2010-004344 A | 1/2010 |
| JP | 2010-128810 A | 6/2010 |
| JP | 2010-257355 A | 11/2010 |
| JP | 2011-155710 A | 8/2011 |
| JP | 2012-115109 A | 6/2012 |

OTHER PUBLICATIONS

Extended European Search Report dated Apr. 26, 2016 issued by the European Patent Office for Application No. 13841892.6.
ECHONET Consortium, ECHONET Lite Specification, Part II, ECHONET Lite Communication Middleware Specification, Sep. 3, 2012, Version 1.00 (English Version).
ECHONET Consortium, ECHONET Specification, Appendix, Detailed Requirements for ECHONET Device objects, Sep. 13, 2012, Release A (English Version).
International Search Report; PCT/JP2013/076231; Nov. 12, 2013.
Office Action dated Oct. 25, 2016 issued by the Japanese Patent Office in the corresponding Japanese Patent Application No. 2016-007470.
ECHONET Consortium, ECHONET Lite Specification Ver 1.01, Part II ECHONET Light Communication Middleware Specification, Mar. 5, 2012, 51 pgs.
Office Action dated Jun. 27, 2017 issued in counterpart Japanese Application No. 2016-007470.

* cited by examiner

MANAGEMENT SYSTEM, MANAGEMENT METHOD AND EQUIPMENT

TECHNICAL FIELD

The present invention relates to a management method used in a management system having an equipment to which a dynamic address is dynamically assigned and a control apparatus that performs communication with the equipment via a predetermined network using the dynamic address assigned to the equipment, and relates also to a control apparatus and an equipment.

BACKGROUND ART

In recent years, a power management system having a plurality of equipments, and a control apparatus which controls the plurality of equipments has been proposed (for example, Patent Literature 1). The plurality of equipments include, for example, household electrical appliances such as air conditioners and illumination, and distributed power sources such as a photovoltaic cell apparatus, a storage battery apparatus, and a fuel cell apparatus. The control apparatus, for example, is referred to as HEMS (Home Energy Management System), SEMS (Store Energy Management System), BEMS (Building Energy Management System), FEMS (Factory Energy Management System), and CEMS (Cluster/Community Energy Management System).

For popularizing the above-described management system, commonization of the message format between the plurality of equipments and the control apparatus is effective, and such a commonization of the message format is being tested.

CITATION LIST

Patent Literature

Patent Literature 1: Japanese Patent Application Publication No. 2010-128810.

SUMMARY OF INVENTION

In the above-described management system, in order for the control apparatus to comprehend the classification of each equipment, a classification message including a classification of an equipment is transmitted from each equipment to the control apparatus. For example, when the equipment is powered on, the equipment transmits the classification message to the control apparatus.

However, when a power failure occurs, it may be possible that a timing at which the equipment is powered on again and a timing at which the control apparatus is powered on again differ. For example, when a power failure occurs, a distributed power source such as a fuel cell and a storage battery powers on itself again by using its own power. Therefore, it may be possible that a timing at which the distributed power source is powered on again is earlier than a timing at which the control apparatus is powered on again. In such a case, it may be possible that the classification message is transmitted before the control apparatus is powered on again and the classification message thus does not reach the control apparatus.

Thus, the present invention has been achieved in order to overcome the above-described problems, and an object thereof is to provide a management system, a management method, and an equipment, which can enhance reachability of a classification message to a control apparatus.

A management system according to a first feature has an equipment to which a dynamic address is dynamically assigned and a control apparatus that performs communication with the equipment via a predetermined network using the dynamic address assigned to the equipment. The equipment includes a transmission unit which repeatedly transmits a classification message including a classification of the equipment over a predetermined period when the equipment is powered on.

In the first feature, the control apparatus transmits an identification information request message for requesting identification information for identifying the equipment to the equipment, in response to reception of the classification message. The transmission unit cancels the repeated transmission of the classification message when the equipment receives the identification information request message in the predetermined period.

In the first feature, the control apparatus transmits an identification information request message for requesting identification information for identifying the equipment to the equipment, in response to reception of the classification message. The transmission unit repeatedly transmits the classification message even after elapse of the predetermined period, when the equipment does not receive the identification information request message in the predetermined period.

In the first feature, the equipment is a load or a distributed power source arranged in a consumer's facility. The control apparatus is arranged in the consumer's facility. The control apparatus manage an energy state in the consumer's facility by controlling an operation of the load or the distributed power source.

In the first feature, the predetermined period is determined in accordance with a time period since the control apparatus is powered off due to a power failure until the control apparatus is powered on again.

In the first feature, the control apparatus is powered on again by power supplied from a grid.

In the first feature, the equipment is a distributed power source. The control apparatus is powered on again by power supplied from the distributed power source.

In the first feature, an interface that connects the equipment and the control apparatus is provided, besides the predetermined network.

In the first feature, the transmission unit transmits information indicating a status of the equipment via the interface.

In the first feature, the predetermined network is a network that complies with a communication protocol of an ECHONET Lite (registered trademark) system.

A management method according to a second feature is a method used in a management system having an equipment to which a dynamic address is dynamically assigned and a control apparatus that performs communication with the equipment via a predetermined network using the dynamic address assigned to the equipment. The management method includes: a step of repeatedly transmitting a classification message including a classification of the equipment over a predetermined period from the equipment to the control apparatus, when the equipment is powered on.

An equipment according to a third feature is dynamically assigned with a dynamic address and performs communication with a control apparatus via a predetermined network using the dynamic address. The equipment includes: a transmission unit which repeatedly transmits a classification message including a classification of the equipment over a predetermined period when the equipment is powered on.

According to the present invention, it is possible to provide a management system, a management method, and an equipment, which can enhance reachability of a classification message to a control apparatus.

DESCRIPTION OF EMBODIMENTS

Hereinafter, a control apparatus and control method according to embodiments of the present invention will be described with reference to the drawings. In the following drawings, identical or similar components are denoted by identical or similar reference numerals.

It should be understood that the drawings are schematic only and the ratio of dimensions is not to scale. Therefore, specific dimensions should be determined with reference to the description below. It is needless to mention that different relationships and ratio of dimensions may be included in different drawings.

Outline of the Embodiments

A management system according to embodiments has an equipment to which a dynamic address is dynamically assigned and a control apparatus that performs communication with the equipment via a predetermined network using the dynamic address assigned to the equipment. The equipment includes a transmission unit which repeatedly transmits a classification message including a classification of the equipment over a predetermined period when the equipment is powered on.

In the embodiment, the equipment repeatedly transmits a classification message over a predetermined period when the equipment is powered on. Therefore, it is possible to enhance reachability of the classification message to the control apparatus.

Here, the predetermined network is a network that complies with a predetermined protocol. Examples of the predetermined protocol include a protocol called "ECHONET Lite" (registered trademark) or "ECHONET" (registered trademark). However, the embodiment is not limited to these protocols, and the predetermined protocol may also include a protocol (for example, SEP2.0 or KNX) other than the "ECHONET Lite" (registered trademark) or the "ECHONET" (registered trademark). It should be noted that in the predetermined network, communication is performed by using a dynamic address.

First Embodiment (Energy Management System)

Figure 1:
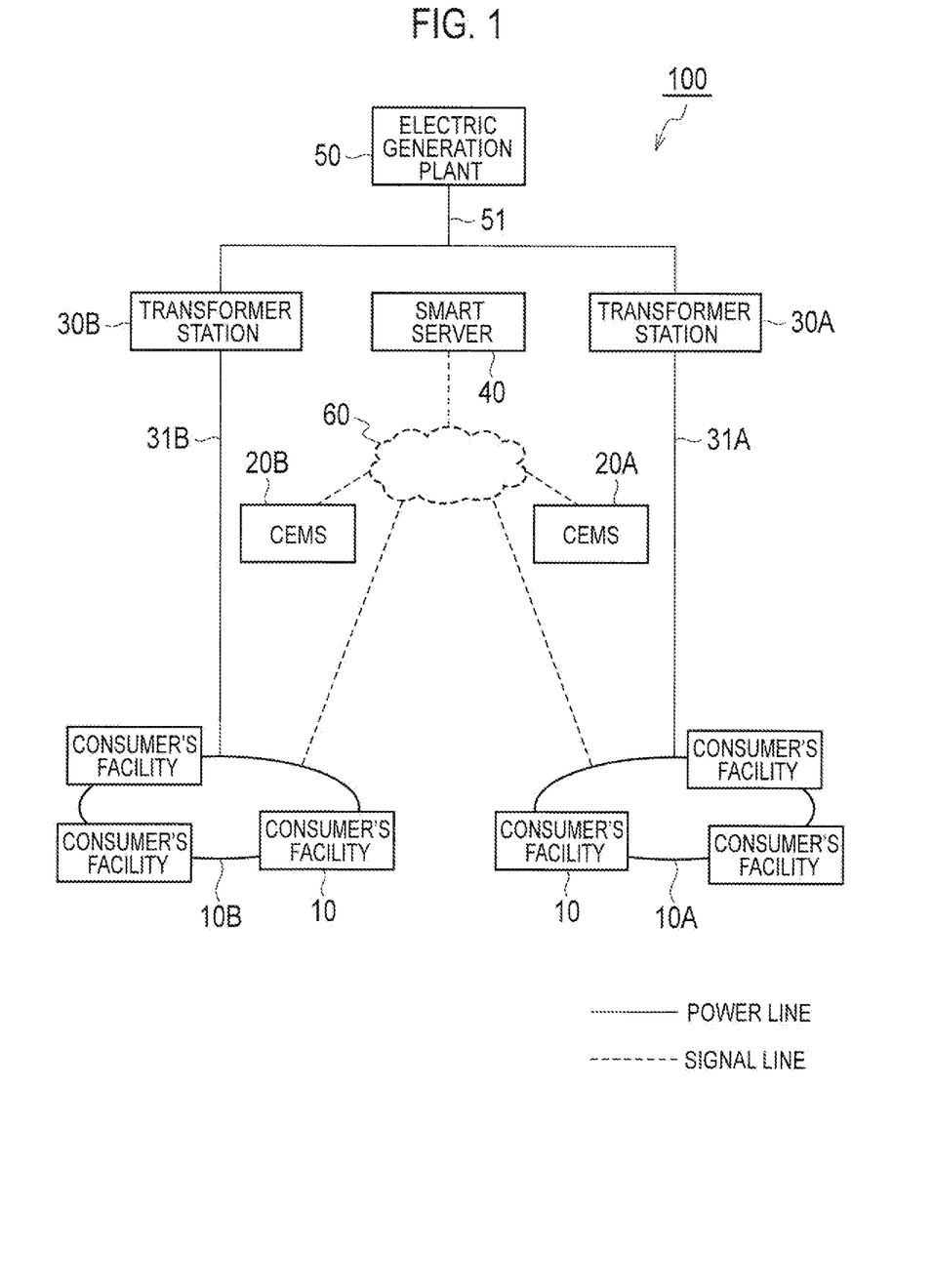
FIG. 1 is a diagram showing an energy management system 100 according to a first embodiment.

The energy management system according to the first embodiment will be described, below. FIG. 1 is a diagram showing an energy management system 100 according to the first embodiment.

As shown in FIG. 1, the energy management system 100 includes a consumer's facility, a CEMS 20, a transformer station 30, a smart server 40, and an electric generation plant 50. It is noted that the consumer's facility, the CEMS 20, the transformer station 30, and the smart server 40 are connected by a network 60.

The consumer's facility has a power generation apparatus and a power storage apparatus, for example. The power generation apparatus is an apparatus which uses fuel gas to output power such as a fuel cell, for example. The power storage apparatus such as a secondary battery is an apparatus in which power is stored.

The consumer's facility may be a detached residence, a housing complex such as an apartment house. Or, the consumer's facility may be a shop such as a corner store or a supermarket. It is noted that the consumer's facility may be a business facility such as an office building or a factory.

In the first embodiment, a consumer's facility group 10A and a consumer's facility group 10B are configured by a plurality of the consumer's facilities 10. The consumer's facility group 10A and consumer's facility group 10B are classified into each geographical region, for example.

The CEMS 20 controls an interconnection between the plurality of consumer's facilities 10 and the power grid. It is noted that the CEMS 20 may be also called a CEMS (Cluster/Community Energy Management System), since the CEMS 20 manages the plurality of consumer's facilities 10. Specifically, the CEMS 20 disconnects the plurality of consumer's facilities 10 and the power grid at a power failure or the like. On the other hand, the CEMS 20 interconnects the plurality of consumer's facilities 10 to the power grid, for example, at restoration of power.

In the first embodiment, a CEMS 20A and a CEMS 20B are provided. The CEMS 20A controls an interconnection between the consumer's facilities 10 included in the consumer's facility group 10A and the power grid, for example. The CEMS 20B controls an interconnection between the consumer's facilities 10 included in the consumer's facility group 10B and the power grid, for example.

The transformer station 30 supplies power to the plurality of consumer's facilities 10 through a distribution line 31. Specifically, the transformer station 30 lowers the voltage supplied from the electric generation plant 50.

In the first embodiment, a transformer station 30A and a transformer station 30B are provided. The transformer station 30A supplies power to the consumer's facilities 10 included in the consumer's facility group 10A through a distribution line 31A, for example. The transformer station 30B supplies power to the consumer's facilities 10 included in the consumer's facility group 10B through a distribution line 31B, for example.

The smart server 40 manages a plurality of the CEMSs 20 (here, the CEMS 20A and CEMS 20B). Further, the smart server 40 manages a plurality of the transformer stations 30 (here, the transformer station 30A and the transformer station 30B). In other words, the smart server 40 integrally manages the consumer's facilities 10 included in the consumer's facility groups 10A and 10B. For example, the smart server 40 has a function of balancing the power to be supplied to the consumer's facility group 10A and the power to be supplied to the consumer's facility group 10B.

The electric generation plant 50 generates power by thermal power, solar power, wind power, water power, atomic power or the like. The electric generation plant 50 supplies power to the plurality of the transformer stations 30 (here, the transformer station 30A and the transformer station 30B) through an electric feeder line 51.

The network 60 is connected to each apparatus via a signal line. The network 60 is an Internet, a wide area network, a narrow area network, and a mobile phone network, for example.

(Consumer's Facility)

Figure 2:
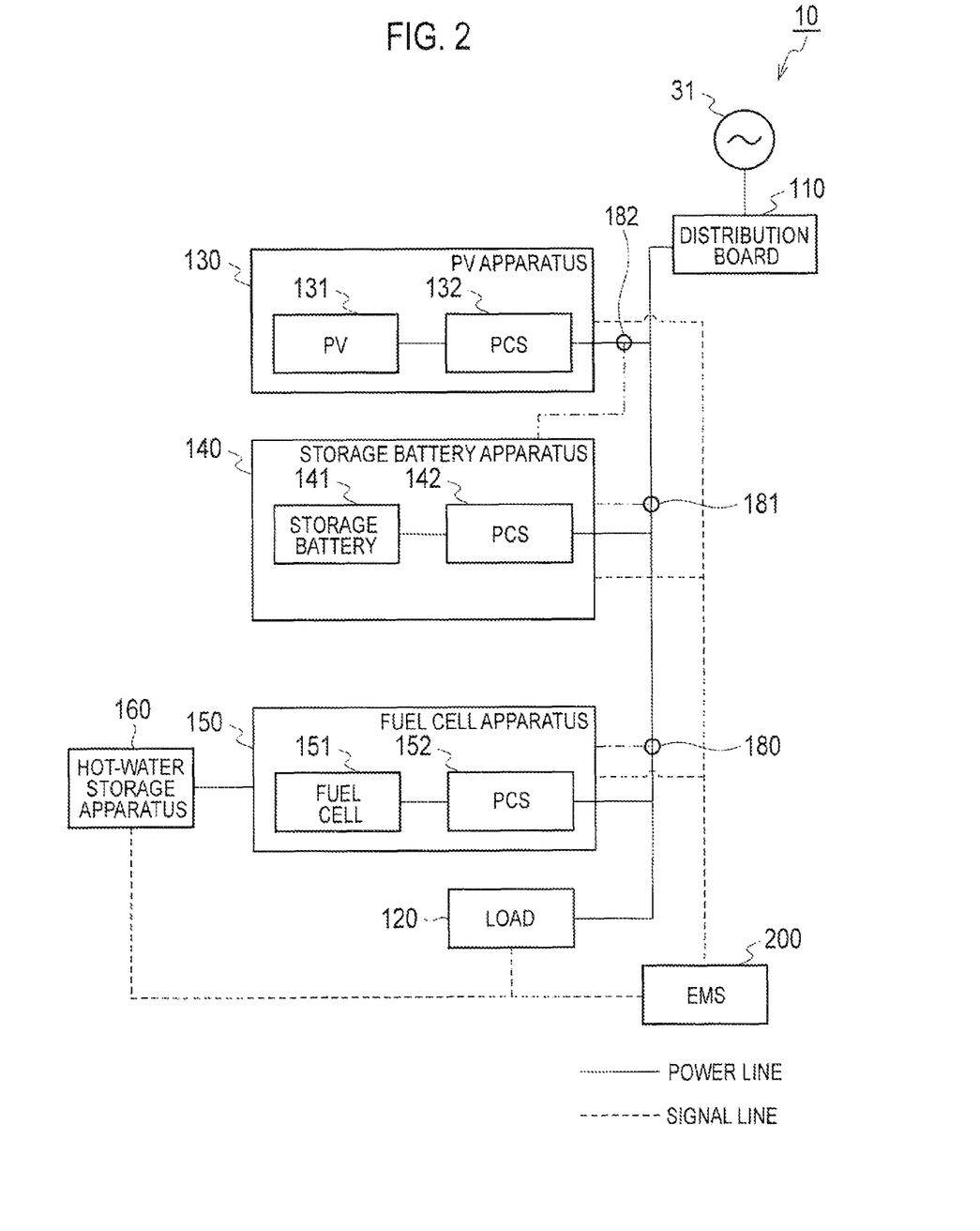
FIG. 2 is a diagram showing a consumer's facility 10 according to the first embodiment.

The consumer's facility according to the first embodiment will be described, below. FIG. 2 is a diagram showing the details of the consumer's facility 10 according to the first embodiment.

As shown in FIG. 2, the consumer's facility 10 has a distribution board 110, a load 120, a PV apparatus 130, a storage battery apparatus 140, a fuel cell apparatus 150, a hot-water storage apparatus 160, and an EMS 200.

In the first embodiment, the consumer's facility 10 has an ammeter 180, an ammeter 181, and an ammeter 182.

The ammeter 180 is used for the load following control on the fuel cell apparatus 150. The ammeter 180 is arranged downstream of a connection point between the storage battery apparatus 140 and a power line (at the side away from the grid) and upstream of a connection point between the fuel cell apparatus 150 and the power line (at the side closer to the grid), on the power line connecting each equipment (for example, the storage battery apparatus 140 and the fuel cell apparatus 150) and the grid. It goes without saying that the ammeter 180 is arranged upstream (at the side closer to the grid) of the connection point between the load 120 and the power line.

The ammeter 181 is used for checking the existence of the flow of power from the storage battery apparatus 140 to the grid (reverse power flow). The ammeter 181 is arranged upstream of a connection point between the storage battery apparatus 140 and a power line (at the side closer to the grid), on the power line connecting each equipment (for example, the storage battery apparatus 140) and the grid.

The ammeter 182 is used for measuring the power generated by the PV apparatus 130. The ammeter 182 is arranged at the side of the PV apparatus 130 from a connection point between a power line connecting each equipment (for example, the PV apparatus 130) and the grid, and the PV apparatus 130.

It should be noted that in the first embodiment, each equipment is connected to the power line in the short-distance order to the grid of the PV apparatus 130, the storage battery apparatus 140, the fuel cell apparatus 150, and the load 120.

The distribution board 110 is connected to the distribution line 31 (a grid). The distribution board 110 is connected, via a power line, to the load 120, the PV apparatus 130, the storage battery apparatus 140, and the fuel cell apparatus 150.

The load 120 is an apparatus which consumes the power supplied via a power line. Examples of the load 120 include an apparatus such as a refrigerator, a freezer, a lighting, and an air conditioner.

The PV apparatus 130 has a PV 131 and a PCS 132. The PV 131 is an example of the power generation apparatus, and is a solar light power generation apparatus (Photovoltaic Device) which generates power in response to reception of solar light. The PV 131 outputs the generated DC power. The amount of power generated by the PV 131 varies depending on the amount of solar radiation entering the PV 131. The PCS 132 is an apparatus (Power Conditioning System) which converts the DC power output from the PV 131, into AC power. The PCS 132 outputs the AC power to the distribution board 110 via a power line.

In the first embodiment, the PV apparatus 130 may have a pyranometer which measures the amount of solar radiation entering the PV 131.

The PV apparatus 130 is controlled by an MPPT (Maximum Power Point Tracking) method. In particular, the PV apparatus 130 optimizes an operation point (point determined by an operation-point voltage value and power value, or a point determined by an operation-point voltage value and electric current value) of the PV 131.

The storage battery apparatus 140 has a storage battery 141 and a PCS 142. The storage battery 141 is an apparatus which accumulates power. The PCS 142 is an apparatus (Power Conditioning System) which converts the AC power supplied from the distribution line 31 (grid), into DC power. Further, the PCS 142 converts the DC power output from the storage battery 141, into AC power.

The fuel cell apparatus 150 has a fuel cell 151 and a PCS 152. The fuel cell 151 is an example of a power generation apparatus, and an apparatus which generates power by using a fuel (gas). The PCS 152 is an apparatus (Power Conditioning System) which converts the DC power output from the fuel cell 151, into AC power.

The fuel cell apparatus 150 is operated by load following control. In particular, the fuel cell apparatus 150 controls the fuel cell 151 so that the power output from the fuel cell 151 reaches a target power of the load following control. In other words, the fuel cell apparatus 150 controls the power output from the fuel cell 151 so that the product of an electric current value detected by the ammeter 180 and a voltage value detected by the PCS 152 becomes target received power.

A hot-water storage apparatus 160 is an apparatus which either generates hot water using fuel (gas), or maintains the water temperature. Specifically, the hot-water storage apparatus 160 has a hot-water storage tank where the water supplied from the hot-water storage tank is warmed by the heat generated by burning of fuel (gas) or the exhaust heat generated by drive (power generation) of the fuel cell 151. In particular, the hot-water storage apparatus 160 warms the water supplied from the hot-water storage tank and feeds the warmed water back to the hot-water storage tank.

It should be noted that in the embodiment, the fuel cell apparatus 150 and the hot-water storage apparatus 160 configure the hot-water supply unit 170 (the hot-water supply system).

The EMS 200 is arranged in the consumer's facility 10, and controls the operation of the load 120 or the distributed power source (the PV apparatus 130, the storage battery apparatus 140, or the fuel cell apparatus 150) to manage an energy state in the consumer's facility 10. Specifically, the EMS 200 is an apparatus (Energy Management System) which controls the PV apparatus 130, the storage battery apparatus 140, the fuel cell apparatus 150, and the hot-water storage apparatus 160. Specifically, the EMS 200 is connected to the PV apparatus 130, the storage battery apparatus 140, the fuel cell apparatus 150, and the hot-water storage apparatus 160 via a signal line, and controls the PV apparatus 130, the storage battery apparatus 140, the fuel cell apparatus 150, and the hot-water storage apparatus 160. Further, the EMS 200 controls an operation mode of the load 120 to control the power consumption of the load 120. For example, the EMS 200 may operate a household product in a power-save mode. Alternatively, the EMS 200 controls the load 120 to change a comfortable feeling without changing the consumed power of the load 120. For example, the EMS 200 may perform wind direction control of an air conditioner or dimmer control of an LED illumination.

Further, the EMS 200 is connected, via the network 60, to various types of servers. The various types of servers store information such as a purchase unit price of power supplied from a grid, a sales unit price of the power supplied from the grid, and a purchase unit price of fuel gas, for example (hereinafter, energy rate information).

Alternatively, various types of servers store information for predicting the power consumption of the load 120 (hereinafter, consumed-energy prediction information), for example. The consumed-energy prediction information may be generated on the basis of an actual value of the power consumption of the load 120 in the past, for example. Alternatively, the consumed-energy prediction information may be a model of the power consumption of the load 120.

Alternatively, various types of servers store information for predicting an amount of power generated by the PV 131 (hereinafter, PV-power-generation-amount prediction information), for example. The PV-power-generation prediction information may be a predicted value of a solar radiation entering the PV 131. Alternatively, the PV-power-generation prediction information may be a weather forecast, a season, and hours of sunlight, for example.

(Network Configuration)

Figure 3:
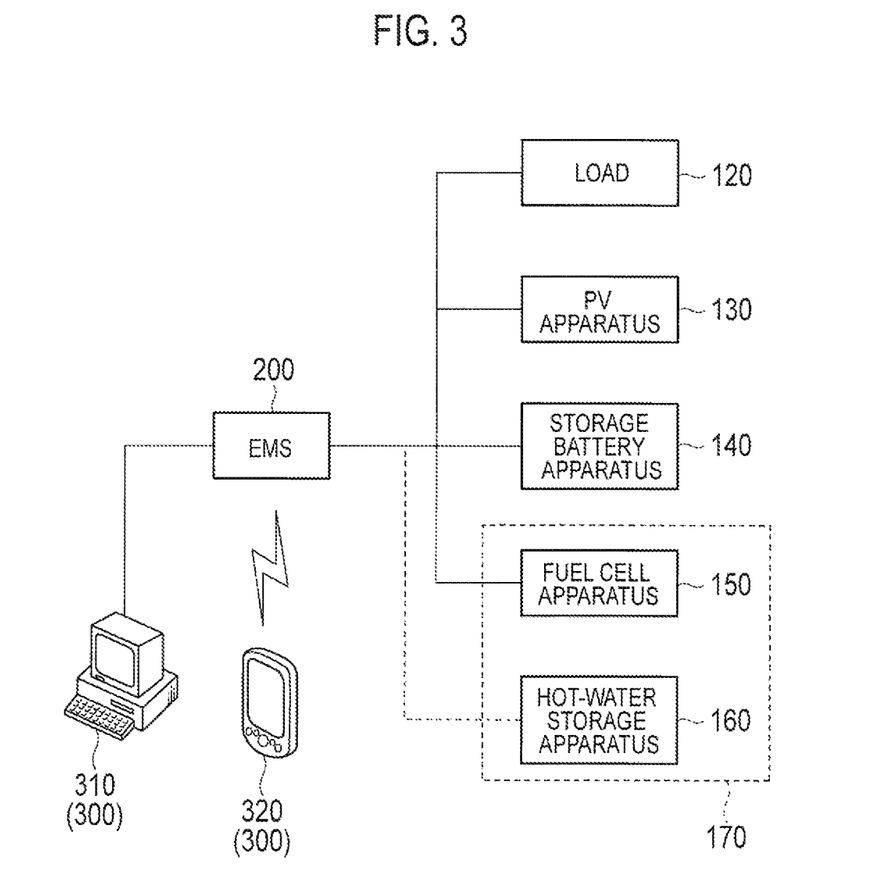
FIG. 3 is a diagram showing a network configuration according to the first embodiment.

Hereinafter, a network configuration according to the first embodiment will be described. FIG. 3 is a diagram showing a network configuration according to the first embodiment.

As shown in FIG. 3, the network is configured by the load 120, the PV apparatus 130, the storage battery apparatus 140, the fuel cell apparatus 150, the hot-water storage apparatus 160, the EMS 200, and a user terminal 300. The user terminal 300 includes a user terminal 310 and a user terminal 320.

The user terminal 310 is connected to the EMS 200, and displays, through a web browser, the information for visualization of energy consumption, a power generation amount, or a power storage amount (hereinafter, visualization information) of each equipment (the load 120, the PV apparatus 130, the storage battery apparatus 140, the fuel cell apparatus 150, and the hot-water storage apparatus 160). In such a case, the EMS 200 generates the visualization information in a format such as HTML, and transmits the generated visualization information to the user terminal 310. The connection type between the user terminal 310 and the EMS 200 may be wired or may be wireless. The user terminal 310 is a personal computer, for example.

The user terminal 320 is connected to the EMS 200, and displays the visualization information through an application. In such a case, the EMS 200 transmits the information indicating energy to be consumed in each equipment, an amount of power to be generated therein, and an amount of power to be accumulated therein, to the user terminal 320. The application of the user terminal 320 generates the visualization information on the basis of the information received from the EMS 200, and displays the generated visualization information. The connection type between the user terminal 320 and the EMS 200 may be wired or may be wireless. The user terminal 320 is a smart phone, for example.

As described above, in the first embodiment, the fuel cell apparatus 150 and the hot-water storage apparatus 160 configure the hot-water supply unit 170. Therefore, the hot-water storage apparatus 160 need not necessarily possess the function of communicating with the EMS 200. In such a case, the fuel cell apparatus 150 substitutes the hot-water storage apparatus 160 and communicates messages concerning the hot-water storage apparatus 160 with the EMS 200.

In the first embodiment, the communication between the EMS 200 and each equipment (the load 120, the PV apparatus 130, the storage battery apparatus 140, the fuel cell apparatus 150, and the hot-water storage apparatus 160) is performed by a method according to a predetermined protocol. Examples of the predetermined protocol include a protocol called "ECHONET Lite" (registered trademark) or "ECHONET" (registered trademark). However, the embodiment is not limited to these protocols, and the predetermined protocol may also include a protocol (for example, SEP2.0 or KNX) other than the "ECHONET Lite" (registered trademark) or the "ECHONET" (registered trademark).

(Application Case)

Figure 4:
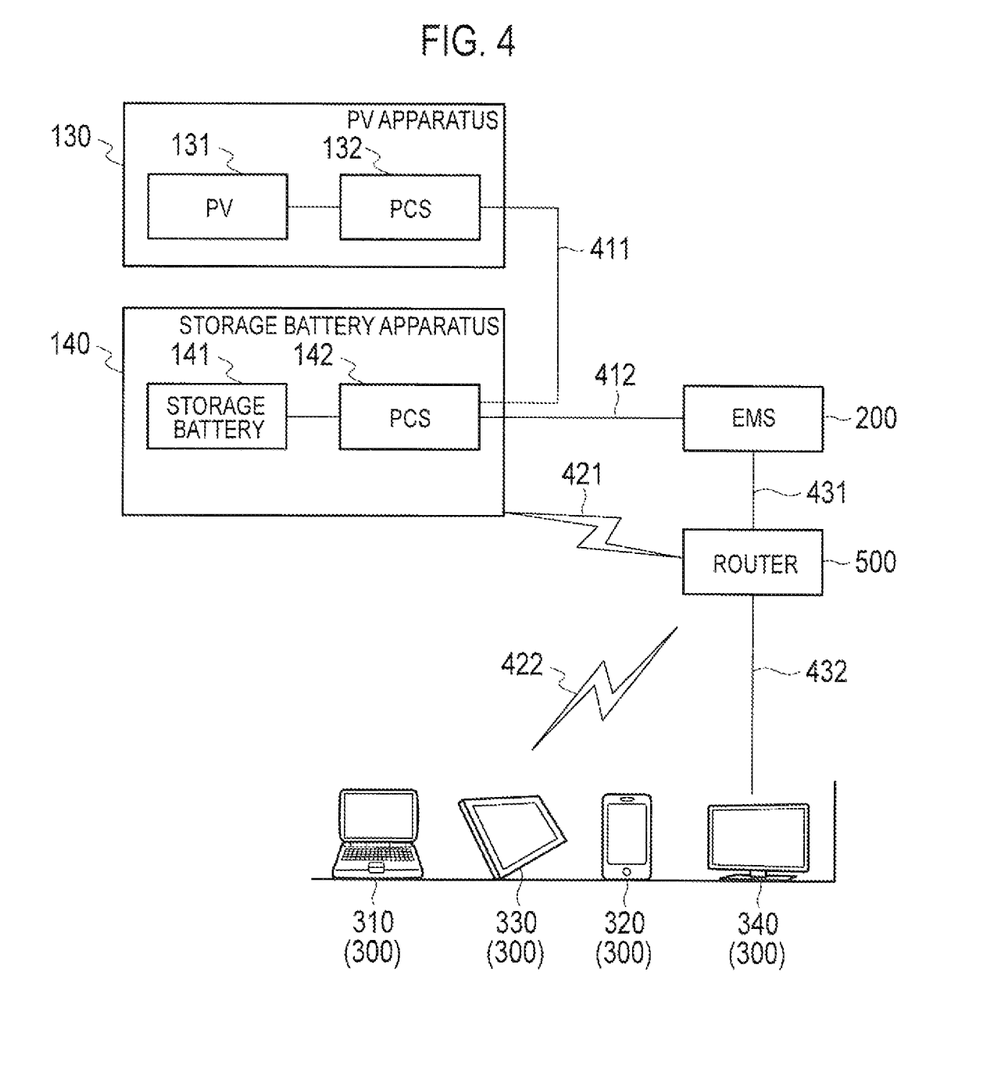
FIG. 4 is a diagram showing a case where the first embodiment is applied.

Hereinafter, the application case according to the first embodiment will be described. FIG. 4 is a diagram showing a case where the first embodiment is applied. In FIG. 4, the network configured by the PV apparatus 130, the storage battery apparatus 140, the EMS 200, and the user terminal 300 will be mainly described.

Here, in FIG. 4, as the user terminal 300, a user terminal 330 and a user terminal 340 are arranged in addition to the user terminal 310 and the user terminal 320. The user terminal 330 is a tablet terminal having an application for displaying visualization information, similarly to the user terminal 320. The user terminal 340 is a display having a web browser for displaying visualization information, similarly to the user terminal 310.

As shown in FIG. 4, the network has a router 500 to which an unchanged address (for example, a global IP address) is assigned. The router 500 functions as a DHCP (Dynamic Host Configuration Protocol) server and assigns a dynamic address (for example, a local IP address) to the PV apparatus 130, the storage battery apparatus 140, the EMS 200, and the user terminal 300. In the network shown in FIG. 4, communication is performed by using the dynamic address assigned by the router 500. As described above, the network in which communication is performed by using the dynamic address complies with a predetermined protocol such as "ECHONET Lite" (registered trademark) and "ECHONET" (registered trademark). However, the communication between the EMS 200 and the user terminal 300 may not comply with a predetermined protocol such as "ECHONET Lite" (registered trademark) and "ECHONET" (registered trademark).

In the first embodiment, the PCS 132 and the PCS 142 are connected by an interface 411. The PCS 142 and the EMS 200 are connected by an interface 412. The interface 411 and the interface 412 are wired interfaces and defined by a manufacturer of the storage battery apparatus 140 (or the PV apparatus 130).

The router 500 and the PCS 142 are connected by a radio connection 421. The router 500 and the user terminal 300 (here, the user terminal 310, the user terminal 320, and the user terminal 330) are connected by a radio connection 422. The radio connection 421 and the radio connection 422 may be replaced by a wired connection.

The EMS 200 and the router 500 are connected by a wired connection 431. The router 500 and the user terminal 300 (here, the user terminal 340) are connected by a wired connection 432. The wired connection 431 and the wired connection 432 may be replaced by a radio connection.

In such a case, information to be transferred in a relatively short interval may preferably be transmitted from the PCS 132, via the interface 411 and the interface 412, to the EMS 200. Likewise, information to be transferred in a relatively short interval may preferably be transmitted from the PCS 142, via the interface 412, to the EMS 200. For example, information indicating a status (output power, for example) of the PV apparatus 130 preferably is transmitted from the PCS 132, via the interface 411 and the interface 412, to the EMS 200. Information indicating a status (recharged power or discharged power, etc.) of the storage battery apparatus 140 is transmitted from the PCS 142, via the interface 412, to the EMS 200.

On the other hand, information allowed to be transferred in a relatively long interval may preferably be transmitted from the EMS 200, via the radio connection 421, to the PCS 142. A command instructing an operation (such as recharging or discharging) of the storage battery apparatus 140 is transmitted from the EMS 200, via the radio connection 421 and the wired connection 431, to the PCS 142. Alternatively, a command indicating an operation mode of the storage battery apparatus 140 is transmitted from the EMS 200, via the radio connection 421 and the wired connection 431, to the PCS 142.

Further, the interface 411 and the interface 412 do not pass through a router, and thus, even when the router is stopped due to a certain reason, it is possible to communicate to the EMS 200 from the PCS 132. Thus, when the router is stopped or it is anticipated that the router is stopped during a power failure, for example, the information preferably is exchanged between the PCS 142 and the EMS 200 via the interface 412. Examples of the information to be exchanged include an operation instruction message of a storage battery during a power failure and a state of a storage battery.

The operation mode of the storage battery apparatus 140 includes an operation mode in a grid interconnected state and an operation mode in a self-sustained operation state. The grid interconnected state is the state in which the storage battery apparatus 140 and the grid are connected in parallel. On the other hand, the self-sustained operation state is the state in which the storage battery apparatus 140 and the grid are disconnected. An example of the self-sustained operation state may include a state in which a power failure occurs.

The operation modes in the grid interconnected state include (a) an operation mode in which the charging and discharging of the storage battery 141 is controlled so that the sales of power generated by the PV apparatus 130 (reverse power flow) is prioritized (a solar light power selling priority mode), (b) an operation mode in which the charging and discharging of the storage battery 141 is controlled so that the storage battery 141 is charged with the power generated by the PV apparatus 130 (a solar light charging mode), (c) an operation mode in which the charging and discharging of the storage battery 141 is controlled so that the power supplied from the grid does not exceed a fixed value (a peak cut mode), (d) an operation mode in which the charging and discharging of the storage battery 141 is controlled so that the storage battery 141 is charged by the power supplied from the grid, in a period when the unit price of the power supplied from the grid is lower than the threshold value (for example, nighttime) (a midnight power utilization mode), (e) an operation mode in which power is accumulated forcibly in the storage battery 141 (a forced charging mode), and (f) an operation mode in which the power accumulated in the storage battery 141 is discharged forcibly (a forced discharging mode), for example.

Here, in the (a) solar light power selling priority mode and the (b) solar light charging mode, the storage battery apparatus 140 must monitor the current measured by the ammeter 182, and then control the charging and discharging of the storage battery 141 according to the amount of power generated by the PV apparatus 130. Since the amount of power generated by the PV apparatus 130 changes momentarily, these operation modes are preferably controlled by the storage battery apparatus 140.

Similarly, in the (c) peak cut mode, the storage battery apparatus 140 must monitor the current measured by the ammeter 181 and the ammeter 182, and then control the charging and discharging of the storage battery 141 according to the amount of power supplied from the grid. The amount of power supplied from the grid is calculated on the basis of a value obtained by subtracting the electric current value measured by the ammeter 182 from the electric current value measured by the ammeter 181. Since the amount of power generated by the PV apparatus 130 and the power consumption of the load 120 change momentarily, this operation mode is preferably controlled by the storage battery apparatus 140.

In the first embodiment, the (a) solar light power selling priority mode, the (b) solar light charging mode, and the (c) peak cut mode are an example of the operation mode in which an equipment other than the storage battery 141 (for example, the PV 131) and the storage battery 141 are cooperated.

The operation modes in the self-sustained operation state include (g) an operation mode in which the power generated by the PV apparatus 130 is accumulated (hereinafter, the self-sustained charging mode), (h) an operation mode in which power is supplied to the load 120 connected to a self-sustained outlet provided in the storage battery apparatus 140 (hereinafter, the self-sustained discharging mode), and (i) an operation mode in which power is supplied to the load 120 connected to a self-sustained outlet provided in the storage battery apparatus 140 while accumulating the power generated by the PV apparatus 130 (hereinafter, the self-sustained charge/discharging mode), for example.

(Configuration of EMS)

Figure 5:
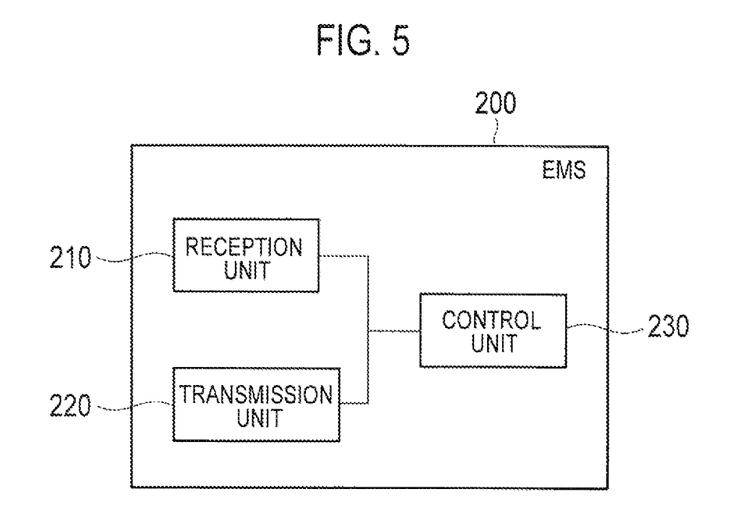
FIG. 5 is a diagram showing an EMS 200 according to the first embodiment.

Hereinafter, an EMS according to the first embodiment will be described. FIG. 5 is a block diagram showing the EMS 200 according to the first embodiment.

As shown in FIG. 5, the EMS 200 has a reception unit 210, a transmission unit 220, and a control unit 230.

The reception unit 210 receives various types of signals from an apparatus connected via a signal line. For example, the reception unit 210 may receive information indicating the amount of power generated by the PV 131, from the PV apparatus 130. The reception unit 210 may receive information indicating the amount of power to be stored in the storage battery 141, from the storage battery apparatus 140. The reception unit 210 may receive information indicating the amount of power generated by the fuel cell 151, from the fuel cell apparatus 150. The reception unit 210 may receive information indicating the amount of hot water to be stored in the hot-water storage apparatus 160, from the hot-water storage apparatus 160.

In the first embodiment, the reception unit 210 may receive energy charge information, energy consumption prediction information, and PV power-generation amount prediction information from the various types of servers via the network 60. However, the energy charge information, the energy consumption prediction information, and the PV power-generation amount prediction information may be stored in advance in the EMS 200.

For example, in the first embodiment, the reception unit 210 receives information indicating the status of the PV apparatus 130 and the storage battery apparatus 140 via an interface (interface 412) defined by a manufacturer.

In the first embodiment, the reception unit 210 receives a classification message (hereinafter, instance list) indicating a classification of the storage battery apparatus 140, via a network (radio connection 421) that complies with a predetermined protocol. The reception unit 210 receives an identification information notification message including identification information for identifying the storage battery apparatus 140, via the network (radio connection 421) that complies with a predetermined protocol. The identification information is unchanged information uniquely determined within a network (radio connection 421) that complies with a predetermined protocol, and defined separately of the dynamic address (for example, a local IP address) assigned to the storage battery apparatus 140. The identification information is a random character string assigned by a manufacturer of the storage battery apparatus 140, for example. Alternatively, the identification information is information uniquely defined during a manufacturing process, that is, a combination of a maker code and a manufacturing serial number, for example.

The transmission unit 220 transmits various types of signals to an apparatus connected via a signal line. For example, the transmission unit 220 transmits a signal for controlling the PV apparatus 130, the storage battery apparatus 140, the fuel cell apparatus 150, and the hot-water storage apparatus 160, to each apparatus. The transmission unit 220 transmits a control signal for controlling the load 120, to the load 120.

For example, in the first embodiment, the transmission unit 220 transmits a command indicating an operation of the storage battery apparatus 140, via a network (radio connection 421) that complies with a predetermined protocol. Alternatively, the transmission unit 220 transmits a command indicating an operation mode of the storage battery apparatus 140, via a network (radio connection 421) that complies with a predetermined protocol.

In the first embodiment, the transmission unit 220 transmits an identification information request message for requesting identification information for identifying the storage battery apparatus 140, via the network (radio connection 421) that complies with a predetermined protocol.

The control unit 230 controls the load 120, the PV apparatus 130, the storage battery apparatus 140, the fuel cell apparatus 150, and the hot-water storage apparatus 160.

Specifically, the control unit 230 manages the storage battery apparatus 140 on the basis of the identification information of the storage battery apparatus 140, in a network that complies with a predetermined protocol. More particularly, the control unit 230 manages classification of the storage battery apparatus 140 and the identification information of the storage battery apparatus 140 in an associated manner. Further, the control unit 230 preferably manages the classification of the storage battery apparatus 140 and the identification information of the storage battery apparatus 140 associated with the dynamic address (for example, a local IP address) assigned to the storage battery apparatus 140.

(Configuration of Storage Battery Apparatus)

Figure 6:
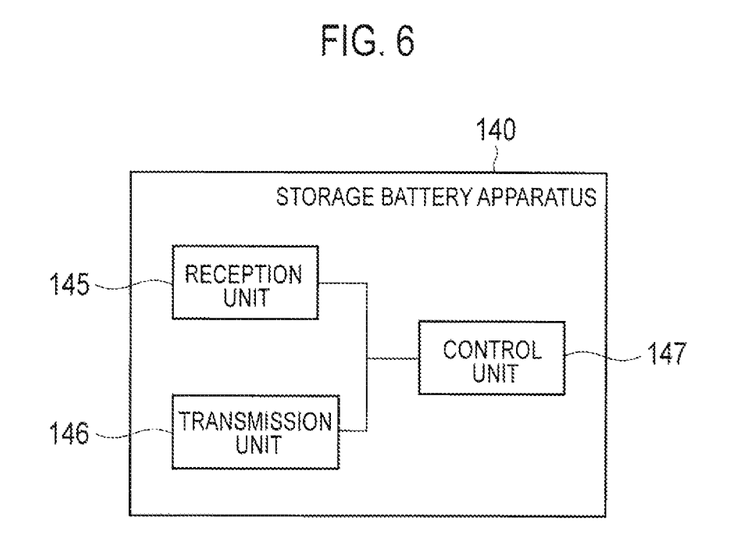
FIG. 6 is a diagram showing a storage battery apparatus 140 according to the first embodiment.

The storage battery apparatus according to the first embodiment will be described, below. FIG. 6 is a block diagram showing the storage battery apparatus 140 according to the first embodiment.

As shown in FIG. 6, the storage battery apparatus 140 has a reception unit 145, a transmission unit 146, and a control unit 147. In the first embodiment, the reception unit 145, the transmission unit 146, and the control unit 147 are arranged in the PCS 142.

The reception unit 145 receives various information from the EMS 200. The reception unit 145 receives information indicating the status of the PV apparatus 130 via an interface (the interface 411) defined by a manufacturer.

In the first embodiment, the reception unit 145 transmits an identification information request message for requesting identification information for identifying the storage battery apparatus 140, via a network (radio connection 421) that complies with a predetermined protocol.

The transmission unit 146 transmits various information to the EMS 200. For example, the transmission unit 146 transmits information indicating the status of the PV apparatus 130 and the storage battery apparatus 140 via an interface (interface 412) defined by a manufacturer.

In the first embodiment, the transmission unit 146 transmits a classification message (hereinafter, instance list) indicating a classification of the storage battery apparatus 140, via a network (radio connection 421) that complies with a predetermined protocol. Specifically, the transmission unit 146 transmits the instance list in response to a predetermined trigger. Here, the predetermined trigger includes power on of the storage battery apparatus 140 and a change of the dynamic address assigned to the storage battery apparatus 140, for example.

Here, as a case where the storage battery apparatus 140 is powered on, a case is considered where after the storage battery apparatus 140 is powered off due to a power failure, the storage battery apparatus 140 is powered on again. In such a case, the storage battery apparatus 140 is powered on again by the power accumulated in the storage battery 141. On the other hand, it is assumed that the EMS 200 is powered on again by the power supplied from a grid. Alternatively, the EMS 200 is powered on again by the power supplied from the distributed power source (the PV apparatus 130, the storage battery apparatus 140, or the fuel cell apparatus 150). In either way, it is assumed that a timing at which the storage battery apparatus 140 is powered on again is earlier than a timing at which the EMS 200 is powered on again.

Therefore, it is preferable that the transmission unit 146 repeatedly transmits the instance list over a predetermined period. Here, the predetermined period is defined in accordance with a time (hereinafter, power failure recovery time) from the EMS 200 is powered off due to a power failure until the EMS 200 is powered on again. The power failure recovery time may be defined by a standard time until the power of the grid is recovered from a power failure. Alternatively, the power failure recovery time may be defined by a standard time since the EMS 200 is supplied with power from the distributed power source after the power failure occurs until OS (Operation System) of the EMS 200 completes reboot.

Further, even when it is configured such that the instance list is repeatedly transmitted over a predetermined period, if the reception unit 145 receives the identification information request message within a predetermined period, then the transmission unit 146 may cancel the repeated transmission of the instance list.

Alternatively, when the reception unit 145 does not receive the identification information request message within a predetermined period, the transmission unit 146 may continue to transmit the instance list even after elapse of the predetermined period.

The transmission unit 146 transmits an identification information notification message including identification information for identifying the storage battery apparatus 140, via a network (radio connection 421) that complies with a predetermined protocol. The transmission unit 146 transmits the identification information notification message, in response to the identification information request message.

The control unit 147 controls the storage battery apparatus 140. Specifically, the control unit 147 controls the PCS 142 on the basis of a command input by a user. Alternatively, the control unit 147 controls the PCS 142 on the basis of a command received by the PCS 142 from the EMS 200.

(Management Method)

Figure 7:
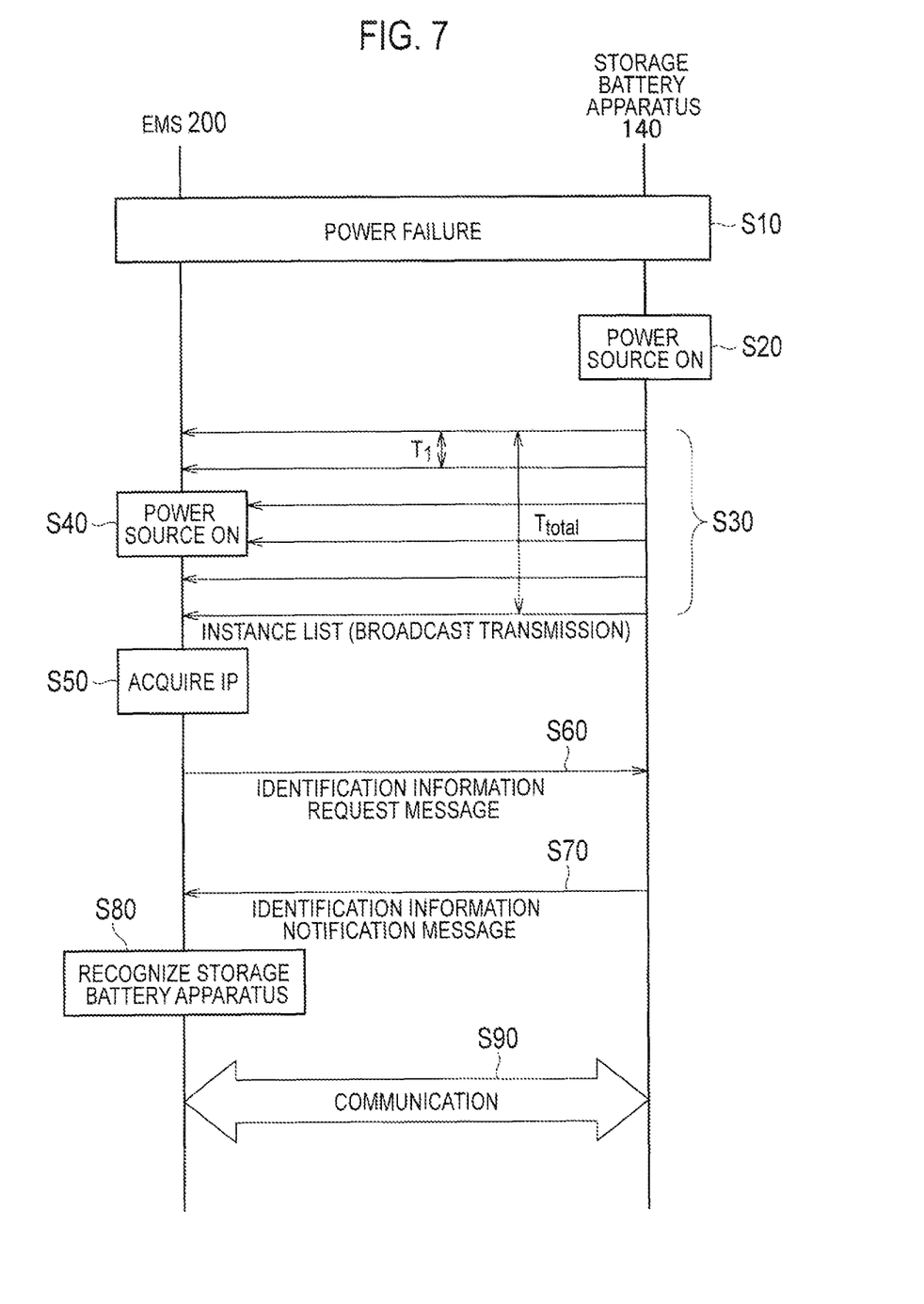
FIG. 7 is a sequence diagram showing a management method according to the first embodiment.

The management method according to the first embodiment will be described, below. FIG. 7 is a sequence diagram showing a management method according to the first embodiment. In FIG. 7, a sequence in a network that complies with a predetermined protocol is shown.

As shown in FIG. 7, in step S10, a power failure occurs. As a result, the storage battery apparatus 140 and the EMS 200 are powered off.

In step S20, the storage battery apparatus 140 is powered on again. Specifically, the storage battery apparatus 140 is powered on again by the power accumulated in the storage battery 141.

In step S30, the storage battery apparatus 140 transmits the classification message (instance list) indicating the classification of the storage battery apparatus 140, via a network (radio line 421) that complies with a predetermined protocol. The storage battery apparatus 140 repeatedly transmits the instance list over a predetermined period.

Particularly the storage battery apparatus 140 repeatedly transmits the instance list in an interval $T_1$. Further, the storage battery apparatus 140 transmits the instance list over a predetermined period $T_{total}$. The predetermined period $T_{total}$ is defined in accordance with a time (hereinafter, power failure recovery time) since the EMS 200 is powered off due to a power failure until the EMS 200 is powered on again, as described above.

Here, the storage battery apparatus 140 does not comprehend the dynamic address of the EMS 200, and thus, it is preferable that the instance list is transmitted by broadcast transmission. The broadcast transmission may be performed either by broadcast or multicast.

In step S40, the EMS 200 is powered on again. Specifically, the EMS 200 is powered on again by the power supplied from a grid. However, the EMS 200 may be powered on again by the power supplied from the distributed power source (the PV apparatus 130, the storage battery apparatus 140, or the fuel cell apparatus 150).

In step S50, the EMS 200 acquires the dynamic address (for example, a local IP address) of the storage battery apparatus 140, on the basis of a transmission-source address of the instance list.

Here, in order to reduce a communication traffic, the EMS 200 may perform processes after step S50 after further elapse of a certain period subsequent to the elapse of the predetermined period $T_{total}$.

In step S60, the EMS 200 transmits the identification information request message for requesting the identification information for identifying the storage battery apparatus 140, to the storage battery apparatus 140. Here, the EMS 200 uses the dynamic address of the storage battery apparatus 140 to transmit the identification information request message, by unicast, to the storage battery apparatus 140.

In step S70, the storage battery apparatus 140 acquires the dynamic address (for example, a local IP address) of the EMS 200, on the basis of a transmission-source address of the identification information request message. Subsequently, the storage battery apparatus 140 transmits the identification information notification message including the identification information for identifying the storage battery apparatus 140, to the EMS 200. Here, the storage battery apparatus 140 uses the dynamic address of the EMS 200 to transmit the identification information notification message, by unicast, to the EMS 200.

In step S80, the EMS 200 recognizes the storage battery apparatus 140. Specifically, the EMS 200 specifies the classification of the storage battery apparatus 140 on the basis of the instance list from the storage battery apparatus 140. The EMS 200 manages the classification of the storage battery apparatus 140 and the identification information of the storage battery apparatus 140 in a manner to associate with the dynamic address (for example, a local IP address) assigned to the storage battery apparatus 140.

In step S90, between the EMS 200 and the storage battery apparatus 140, communication is performed by using the dynamic address.

As described above, in the first embodiment, the storage battery apparatus 140 repeatedly transmits the classification message (instance list) over a predetermined period when the storage battery apparatus 140 is powered on. Therefore, it is possible to enhance reachability of the classification message to the EMS 200.

In the first embodiment, when the storage battery apparatus 140 is managed on the basis of the identification information that is unchanged information uniquely determined within the radio line 421, it is possible to appropriately manage the storage battery apparatus 140 even when the dynamic address (for example, a local IP address) assigned to the storage battery apparatus 140 may be changed.

Alternatively, when the storage battery apparatus 140 receives the identification information request message within the predetermined period $T_{total}$, in step S30, the storage battery apparatus 140 may cancel the repeated transmission of the instance list. As a result, it is possible to restrain generation of a wasted communication.

Alternatively, when the storage battery apparatus 140 does not receive the identification information request message within the predetermined period $T_{total}$, in step S30, the storage battery apparatus 140 may transmit the instance list even after elapse of the predetermined period $T_{total}$ (for example, even over the predetermined period $T_{total}$). As a result, it is possible to enhance reachability of the classification message (instance list) to the EMS 200.

Other Embodiments

The present invention is explained through the above-described embodiments, but it must not be understood that this invention is limited by the statements and the drawings constituting a part of this disclosure. From this disclosure, various alternative embodiments, examples, and operational technologies will become apparent to those skilled in the art.

The EMS 200 may be HEMS (Home Energy Management System), may be SEMS (Store Energy Management System), may be BEMS (Building Energy Management System), and may be FEMS (Factory Energy Management System).

In the embodiment, as an example of equipment, the storage battery apparatus 140 is described. However, the embodiment is not limited thereto. The equipment may be a distributed power source such as the PV apparatus 130 and the fuel cell apparatus 150. Alternatively, the equipment may be the load 120 such as a refrigerator, a freezer, a lighting, and an air conditioner. Alternatively, the equipment may be the hot-water storage apparatus 160.

In the embodiment, the EMS 200 manages the storage battery apparatus 140 on the basis of the identification information of the storage battery apparatus 140. However, the embodiment is not limited thereto. The EMS 200 may manage the storage battery apparatus 140 on the basis of the dynamic address dynamically assigned to the storage battery apparatus 140. Even in such a case, the reachability of the classification message to the EMS 200 is high, and thus, it is possible to appropriately manage the storage battery apparatus 140. That is, in FIG. 7, the processes in step S60 and step S70 may be omitted.

Although description is not provided in the embodiment, it may be possible to provide a program for causing a computer to execute each process performed by the storage battery apparatus 140. Furthermore, the program may be recorded on a computer-readable medium. By using the computer-readable medium, it is possible to install the program in a computer. Here, the computer-readable medium recording the program thereon may include a non-transitory recording medium. The non-transitory recording medium is not particularly limited. For example, the non-transitory recording medium may include a recording medium such as a CD-ROM or a DVD-ROM.

Alternatively, it may be possible to provide a chip configured by a memory for storing therein a program for performing each process performed by the storage battery apparatus 140, and a processor for executing the program stored in the memory. It may be possible to provide a memory for storing therein a program for performing each process performed by the storage battery apparatus 140, and a communication processing apparatus for executing the program stored in the memory.

Thus, it goes without saying that the present invention includes various embodiments and the like not described here. Moreover, it is also possible to combine the above-described embodiments and modifications. Therefore, the technical range of the present invention is to be defined only by the inventive specific matter according to the adequate claims from the above description.

It is noted that the entire content of Japanese Patent Application No. 2012-215300 (filed on Sep. 27, 2012) is incorporated in the present specification by reference.

INDUSTRIAL APPLICABILITY

According to the present invention, it is possible to provide a management system, a management method, and an equipment, which can enhance reachability of a classification message to a control apparatus.

The invention claimed is:

1. An equipment to which a dynamic address is dynamically assigned within a management system having a control apparatus that performs communication with the equipment via a network using the dynamic address assigned to the equipment, wherein the equipment comprises:
    a transmitter; and
    at least one processor that,
        when the equipment is turned on, controls the transmitter to repeatedly transmit a classification message, indicating a class to which the equipment belongs, over the network, for a predetermined time period, using the dynamic address, assigned to the equipment, as a source address, and,
        in response to receiving an identification information request message from the control apparatus within the predetermined time period,
            cancels transmission of the classification message, and
            transmits an identification information message, identifying the equipment, over the network to the control apparatus.

2. The equipment according to claim 1, wherein the at least one processor controls the transmitter to repeatedly transmit the classification message even after elapse of the predetermined time period, when the identification information request message is not received within the predetermined time period.

3. The equipment according to claim 1, wherein the predetermined time period comprises a time period needed by the control apparatus to be powered on.

4. The equipment according to claim 1, further comprising an interface that connects the equipment to the control apparatus in addition to a connection between the equipment and the control apparatus over the network.

5. The equipment according to claim 4, wherein the at least one processor controls the transmitter to transmit information indicating a status of the equipment via the interface.

6. The equipment according to claim 1, wherein the network complies with a communication protocol of an ECHONET Lite (registered trademark) system.

7. A management system comprising:
    the equipment according to claim 1, wherein the equipment is a load or a distributed power source arranged in a consumer's facility; and
    the control apparatus, wherein the control apparatus is arranged in the consumer's facility, and controls an operation of the load or the distributed power source.

8. The management system according to claim 7, wherein the control apparatus is powered by power supplied from a grid.

9. The management system according to claim 7, wherein the equipment is a distributed power source, and the control apparatus is powered by power supplied from the distributed power source.

10. A management method used by an equipment to which a dynamic address is dynamically assigned within a management system having a control apparatus that performs communication with the equipment via a network using the dynamic address assigned to the equipment, the method comprising:
    when the equipment is turned on, repeatedly transmitting, from the equipment, a classification message, indicating class to which the equipment belongs, over the network, for a predetermined time period, using the dynamic address, assigned to the equipment, as a source address; and,
    in response to receiving an identification information request message from the control apparatus within the predetermined time period, by the equipment,
        canceling transmission of the classification message, and
        transmitting an identification information message, identifying the equipment, over the network to the control apparatus.

* * * * *